US012625786B2

(12) United States Patent
    Wu

(10) Patent No.: US 12,625,786 B2
(45) Date of Patent: May 12, 2026

(54) MEMORY SYSTEMS, OPERATION METHODS THEREOF, AND COMPUTER-READABLE STORAGE MEDIUMS TO DETECT AN ABNORMALITY IN FIRMWARE

(71) Applicant: Yangtze Memory Technologies Co., Ltd., Wuhan (CN)

(72) Inventor: Zhebo Wu, Wuhan (CN)

(73) Assignee: Yangtze memory Technologies Co., Ltd., Wuhan (CN)

( * ) Notice: Subject to any disclaimer, the term of this patent is extended or adjusted under 35 U.S.C. 154(b) by 35 days.

(21) Appl. No.: 18/672,895

(22) Filed: May 23, 2024

(65) Prior Publication Data

US 2025/0298707 A1    Sep. 25, 2025

(30) Foreign Application Priority Data

Mar. 21, 2024    (CN) .......................... 202410330634.7

(51) Int. Cl.
    *G06F 11/22*        (2006.01)
    *G06F 11/07*        (2006.01)
    *G06F 11/273*       (2006.01)
(52) U.S. Cl.
    CPC ........ *G06F 11/221* (2013.01); *G06F 11/0778* (2013.01); *G06F 11/2733* (2013.01)
(58) Field of Classification Search
    CPC . G06F 11/221; G06F 11/0778; G06F 11/2733
    See application file for complete search history.

(56) References Cited

U.S. PATENT DOCUMENTS

| | | | | |
|---|---|---|---|---|
| 2015/0193297 A1* | 7/2015 | Ngo | ...................... | H04L 1/0061 |
| | | | | 714/758 |
| 2015/0193298 A1* | 7/2015 | Ngo | ........................ | G06F 11/08 |
| | | | | 714/758 |
| 2015/0193321 A1* | 7/2015 | Ngo | .......................... | G06F 1/10 |
| | | | | 714/766 |
| 2015/0324265 A1* | 11/2015 | Nelson | .................. | G06F 11/263 |
| | | | | 714/43 |
| 2019/0108149 A1* | 4/2019 | Graif | .................. | G06F 13/4291 |
| 2019/0205244 A1* | 7/2019 | Smith | ..................... | G06F 3/065 |
| 2019/0213152 A1* | 7/2019 | Jacobs | .................... | G06F 15/00 |

(Continued)

FOREIGN PATENT DOCUMENTS

| | | | | | |
|---|---|---|---|---|---|
| GB | | 2411013 A | * | 8/2005 | ......... G06F 13/4213 |
| WO | WO-2005062182 A1 | | * | 7/2005 | .......... G06F 11/0706 |

*Primary Examiner* — Ashish Thomas
*Assistant Examiner* — Indranil Chowdhury
(74) *Attorney, Agent, or Firm* — Hanley, Flight & Zimmerman, LLC

(57)        ABSTRACT

The present disclosure provides a memory system, an operation method thereof, and a computer-readable storage medium. The memory system includes: a memory device and a memory controller coupled with the memory device. The memory system includes a general-purpose input/output interface including a first pin that is configurable to receive data transmitted by serial communication. The memory controller is configured to: trigger an interruption by the first pin in response to abnormality of a firmware of the memory system during operation; and trigger an assert dump mode in response to the interruption triggered by the first pin.

20 Claims, 12 Drawing Sheets

```
┌──────────────────────────────────────────────────────────┐
│ Trigger an interruption, by a first pin of a general-      │      ╭─ S10
│ purpose input/output interface of the memory system that   │
│ is configurable to receive data transmitted by serial      │
│ communication, in response to abnormity of a firmware of   │
│ the memory system during operation                         │
└──────────────────────────────────────────────────────────┘
                            │
                            ▼
┌──────────────────────────────────────────────────────────┐
│ Trigger an assert dump mode in response to the             │      ╭─ S20
│ interruption triggered by the first pin                    │
└──────────────────────────────────────────────────────────┘
```

(56) References Cited

U.S. PATENT DOCUMENTS

| | | | |
|---|---|---|---|
| 2021/0181990 A1* | 6/2021 | Balb ..................... | G06F 3/0679 |
| 2021/0200619 A1* | 7/2021 | Liang .................. | G06F 11/0775 |
| 2021/0200620 A1* | 7/2021 | Sassara .............. | G06F 13/1668 |
| 2022/0138038 A1* | 5/2022 | Liang .................. | G06F 11/0775 |
| | | | 714/45 |
| 2023/0207035 A1* | 6/2023 | Cheng ................... | G11C 29/44 |
| | | | 365/201 |

* cited by examiner

100

Trigger an interruption, by a first pin of a general-purpose input/output interface of the memory system that is configurable to receive data transmitted by serial communication, in response to abnormity of a firmware of the memory system during operation ⟋—S10

Trigger an assert dump mode in response to the interruption triggered by the first pin ⟋—S20

Figure 10:
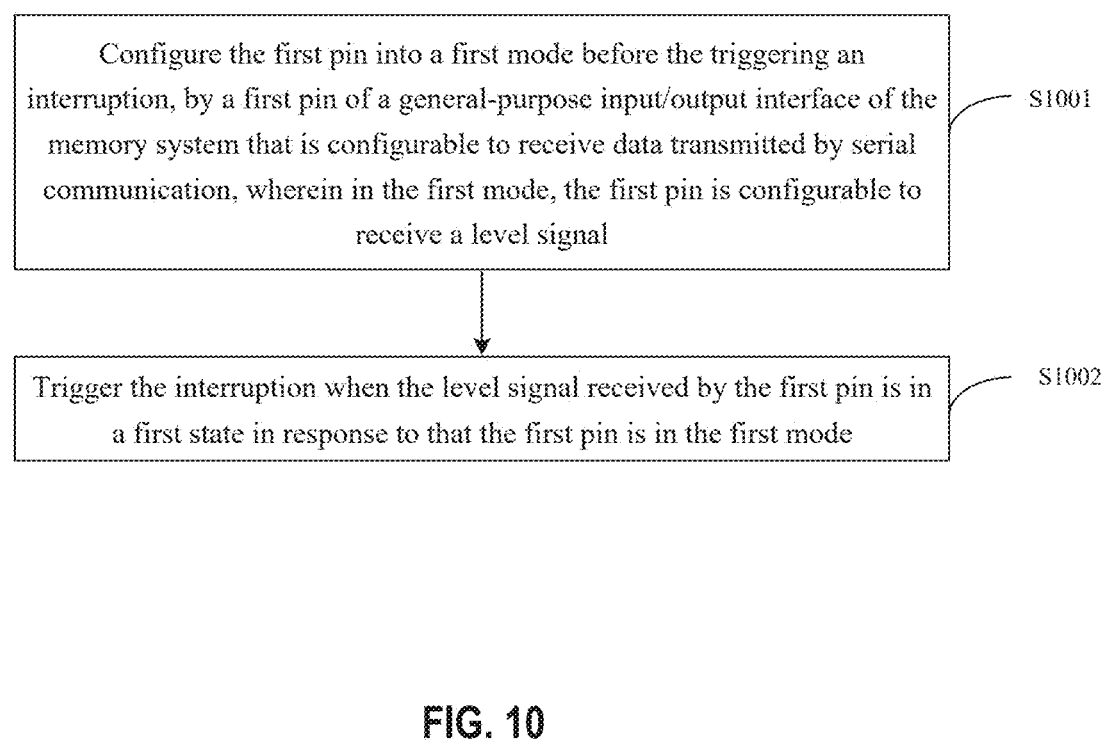

Configure the first pin into a first mode before the triggering an interruption, by a first pin of a general-purpose input/output interface of the memory system that is configurable to receive data transmitted by serial communication, wherein in the first mode, the first pin is configurable to receive a level signal ⟋ S1001

Trigger the interruption when the level signal received by the first pin is in a first state in response to that the first pin is in the first mode ⟋ S1002

Put a level signal received by the first pin into the rising edge state in response to that the first pin is short-circuited with the first grounding pin

S2002

Trigger the interruption in response to that the level signal received by the first pin is in the rising edge state

S3001

Put a level signal received by the second pin into the rising edge state in response to that the second pin is short-circuited with the second ground pin

S3002

Trigger the interruption in response to that the level signal received by the first pin is in the rising edge state and the level signal received by the second pin is in the rising edge state

MEMORY SYSTEMS, OPERATION METHODS THEREOF, AND COMPUTER-READABLE STORAGE MEDIUMS TO DETECT AN ABNORMALITY IN FIRMWARE

REFERENCE TO RELATED APPLICATION

The present application claims the benefit of priority to China Application No. 202410330634.7, filed on Mar. 21, 2024, the content of which is incorporated herein by reference in its entirety.

TECHNICAL FIELD

The present disclosure relates to the field of semiconductor technology, and particularly to memory systems, operation methods thereof, and computer-readable storage mediums.

BACKGROUND

With the rapid development of data storage technology, more and more data memory systems have been present in electronic apparatuses used by people, such as Solid State Drives (SSDs), etc. The SSDs have been widely applied in military, vehicle, industrial, medical, and aviation fields, etc. due to the characteristics of high read-write speeds, anti-vibration, low power consumption, noiselessness, low heat, light weight, and the like.

BRIEF DESCRIPTION OF THE DRAWINGS

FIG. 10 is a flow diagram II of an operation method of a memory system provided by examples of the present disclosure.

DETAILED DESCRIPTION

Figure 1:
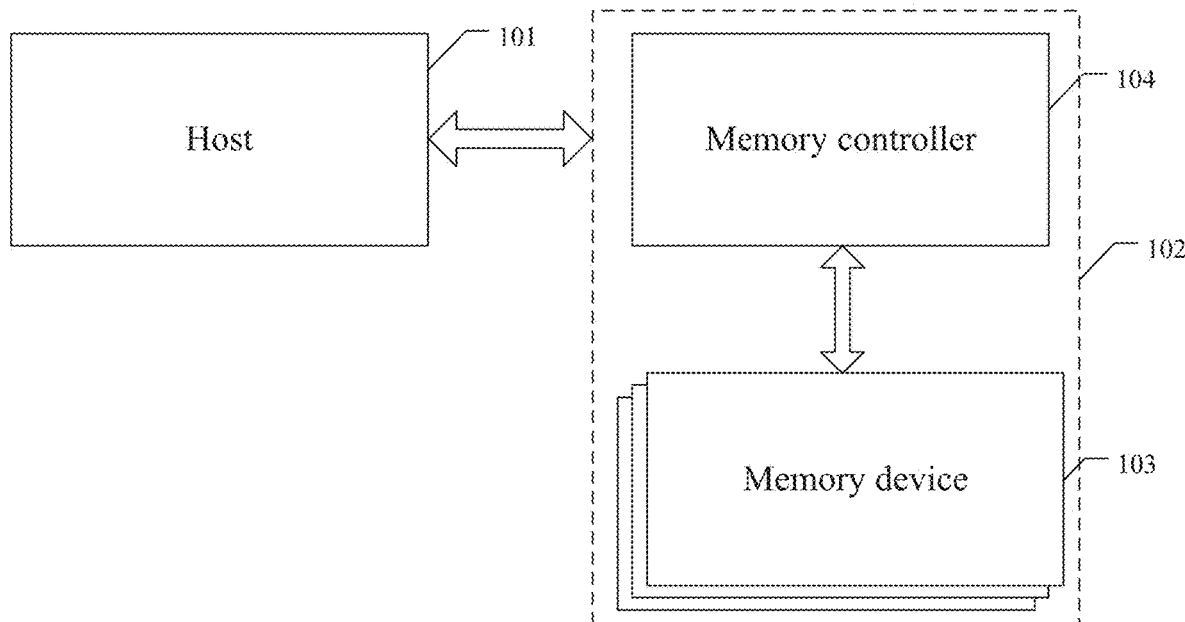
FIG. 1 is a schematic diagram of an example system having a memory system provided by examples of the present disclosure.

Example implementations disclosed by the present disclosure will be described below in more details with reference to the drawings. Although the example implementations of the present disclosure are shown in the drawings, it is to be understood that the present disclosure may be implemented in various forms and should not be limited by the specific implementations set forth herein. Rather, these implementations are provided for a more thorough understanding of the present disclosure, and to fully convey a scope disclosed by the present disclosure to those skilled in the art.

In the following description, numerous specific details are given in order to provide a more thorough understanding of the present disclosure. However, it is apparent to those skilled in the art that the present disclosure may be practiced without one or more of these details. In other examples, in order to avoid confusion with the present disclosure, some technical features well-known in the field are not described. That is, not all the features of the actual examples are described herein, and well-known functions and structures are not described in detail.

In the drawings, like reference numerals denote like elements throughout the specification.

It is to be understood that, spatially relative terms, such as "beneath", "below", "lower", "under", "over", "upper", and the like, may be used herein for ease of description to describe the relationship between one element or feature and other elements or features as illustrated in the figures. It is to be understood that, the spatially relative terms are intended to further encompass different orientations of a device in use or operation in addition to the orientation depicted in the figures. For example, if the device in the drawings is turned over, then the elements or the features described as "below" or "under" or "beneath" other elements may be oriented "on" the other elements or features. Thus, the example terms "below" and "beneath", may comprise both upper and lower orientations. The device may be orientated otherwise (rotated by 90 degrees or in other orientations), and the spatially descriptive terms used herein are interpreted accordingly.

The terms used herein are only intended to describe the specific examples, and are not used as limitations of the present disclosure. As used herein, unless otherwise indicated expressly in the context, "a", "an" and "the" in a singular form are also intended to comprise a plural form. It should also be understood that terms "consist of" and/or "comprise", when used in this specification, determine the presence of the described features, integers, steps, operations, elements and/or components, but do not preclude the presence or addition of one or more of other features, integers, steps, operations, elements, components, and/or groups. As used herein, the term "and/or" comprises any and all combinations of related items listed.

A memory system in the examples of the present disclosure includes, but is not limited to, a memory system of a three-dimensional NAND memory. For ease of understanding, the memory system provided by the present disclosure is illustrated by using the memory system comprising the three-dimensional NAND memory as an example.

FIG. 1 is a schematic diagram of an example system having a memory system provided by examples of the present disclosure. In the examples of the present disclosure, the system 100 may be a mobile phone, a desktop computer, a laptop computer, a tablet computer, a vehicle computer, a gaming console, a printer, a positioning apparatus, a wearable electronic apparatus, a smart sensor, a Virtual Reality (VR) apparatus, an Augmented Reality (AR) apparatus, or any other suitable electronic apparatus having a memory therein. As shown in FIG. 1, the system 100 may comprise a host 101 and a memory system 102, wherein the memory system 102 may comprise one or more memory devices 103 and a memory controller 104. The host 101 may comprise a processor of an electronic apparatus, such as a Central Processing Unit (CPU), or a System on a Chip (SoC), e.g., an Application Processor (AP). The host 101 may be configured to send or receive data to or from the memory system 102.

In some implementations, the memory controller 104 is coupled to the memory device 103 and the host 101, and is configured to control the memory device 103. The memory controller 104 may manage data stored in the memory device 103, and communicate with the host 101. In some implementations, the memory controller 104 is designed for operating in low duty-cycle environments, e.g., secure digital cards, Compact Flash Cards (CFCs), Universal Serial Bus (USB) flash drives, or other media for use in electronic apparatuses, such as personal computers, digital cameras, mobile phones, etc. In some other implementations, the memory controller 104 is designed for operating in high duty-cycle environments, e.g., solid state drives or Embedded Multi-Media Cards (eMMCs).

In some examples, the memory controller 104 and the one or more memory devices 103 may be integrated into various types of memory devices, that is, the memory system 102 may be implemented and packaged into different types of end electronic products.

Figure 2:
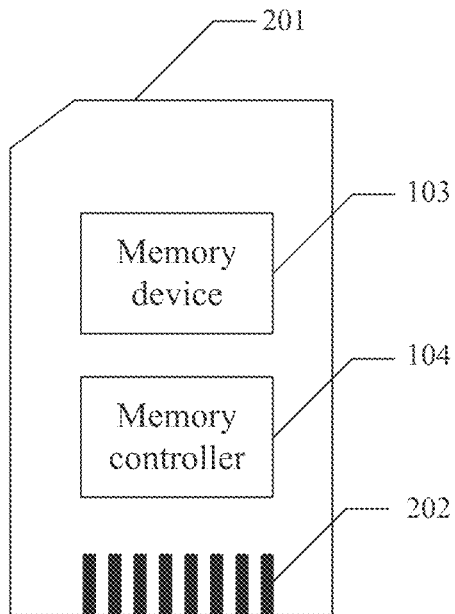
FIG. 2 is a schematic diagram of an example memory card having a memory system provided by examples of the present disclosure.
Figure 3:
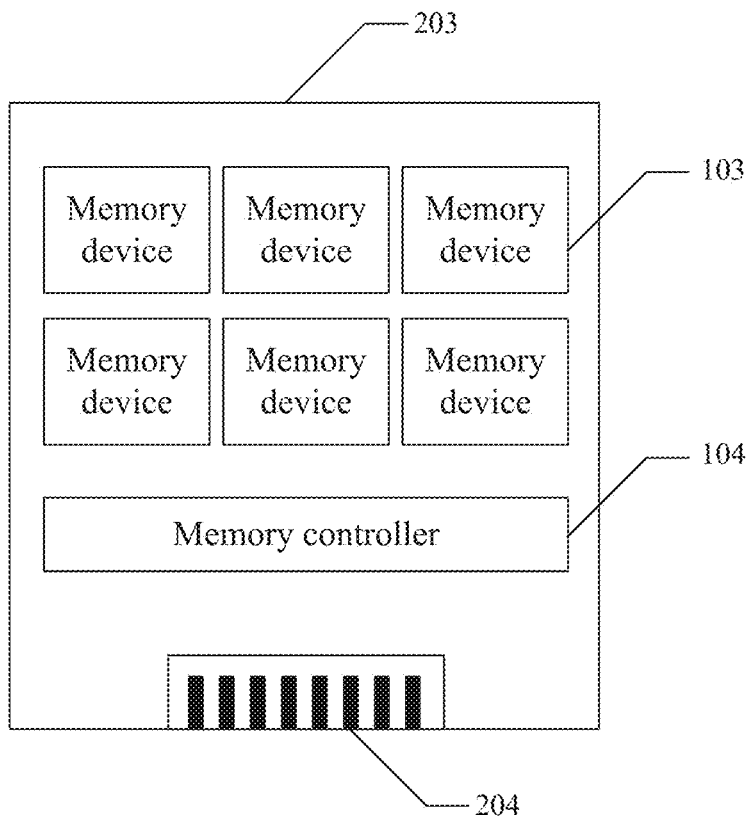
FIG. 3 is a schematic diagram of an example solid state drive having a memory system provided by examples of the present disclosure.

In one example as shown in FIG. 2, the memory controller 104 and a single memory device 103 may be integrated into a memory card 201. The memory card 201 may be one of a compact flash card, a Smart Media Card (SMC), a Memory Stick (MS), a Multi-Media Card (MMC) such as RS-MMC, MMCmicro, eMMC, etc., a secure digital card such as a Mini SD card, a Micro SD card, an SDHC card, etc., or a universal flash card. The memory card 201 may further comprise a memory card connector 202 coupling the memory card 201 with a host (e.g., the host 101 in FIG. 1). In another example as shown in FIG. 3, the memory controller 104 and a plurality of memory devices 103 may be integrated into an SSD 203. The SSD 203 may further comprise an SSD connector 204 coupling the SSD 203 with a host (e.g., the host 101 in FIG. 1). In some implementations, the storage capacity and/or operation speed of the SSD 203 are/is greater than the storage capacity and/or operation speed of the memory card 201.

Figure 4:
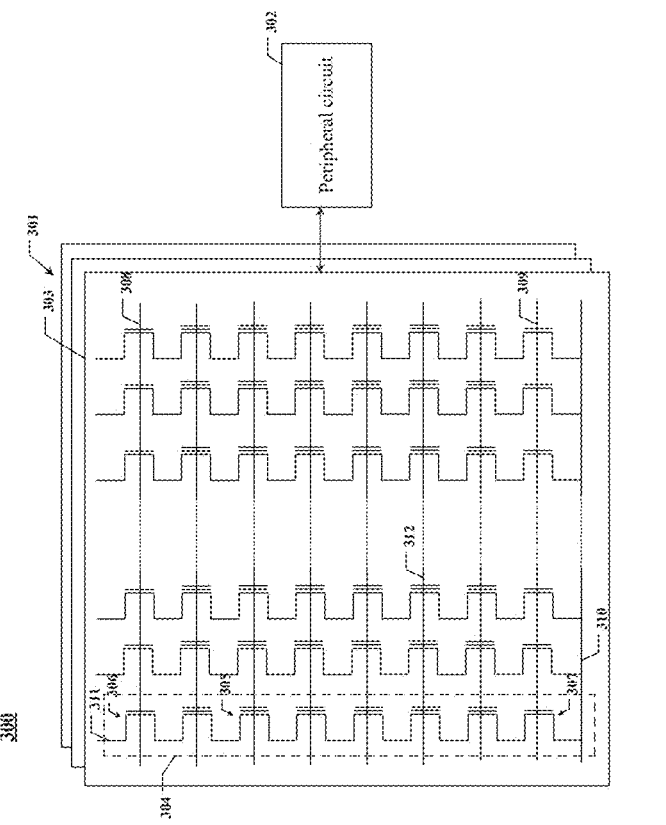
FIG. 4 is a schematic diagram of an example memory device comprising a peripheral circuit provided by examples of the present disclosure.

FIG. 4 is a schematic circuit diagram of an example memory device 300 comprising a peripheral circuit provided by examples of the present disclosure. The memory device 300 may be an example of the memory device 103 in FIG. 1. The memory device 300 may comprise a memory array 301 and a peripheral circuit 302 coupled to the memory array 301. Taking the memory array 301 as a three-dimensional NAND memory array as an example for illustration, a memory cell 305 is a NAND memory cell, and is provided in a form of an array of memory cell strings 304; and each memory cell string 304 extends vertically above a substrate (not shown). In some implementations, each memory cell string 304 may comprise a plurality of memory cells 305 coupled in series and stacked vertically. Each memory cell 305 may hold a continuous analog value, such as a voltage or charge, which depends on the number of electrons trapped within a region of the memory cells 305. Each memory cell 305 may be either a floating gate type memory cell that comprises a floating gate transistor, or a charge trapping type memory cell that comprises a charge trapping transistor.

The principle of data writing of the memory cell is introduced below by taking the floating gate type memory cell as an example. When data is written to the memory cells, a program voltage may be loaded to a control gate of a floating gate field effect transistor, such that electrons in a channel of the floating gate field effect transistor tunnels to a floating gate. The number of electrons tunneling to the floating gate can be controlled by controlling a magnitude of the program voltage, so as to further control a magnitude of a threshold voltage Vth of the floating gate field effect transistor. Generally, the higher the quantity of charge stored in the floating gate is, the higher the threshold voltage Vth of the floating gate field effect transistor is. It may be understood that when the threshold voltages Vth of the floating gate field effect transistors are different, the voltages required to be loaded to the control gates of the floating gate field effect transistors when controlling to turn on the floating gate field effect transistors are different. Therefore, the magnitude of the threshold voltage Vth of the floating gate field effect transistor may reflect contents of data stored therein.

In some implementations, each memory cell 305 is a Single Level Cell (SLC) that has two possible memory states and thus may store one bit of data. For example, a first memory state "0" may correspond to a first voltage range, and a second memory state "1" may correspond to a second voltage range. In some implementations, each memory cell 305 is a multi-level cell that can store more than a single bit of data in four or more memory states, e.g., a Multi-Level Cell (MLC) storing two bits per cell, a Triple Level Cell (TLC) storing three bits per cell, or a Quad-Level Cell (QLC) storing four bits per cell.

As shown in FIG. 4, each memory cell string 304 may comprise a bottom select transistor (BST) 307 at a source terminal thereof and a top select transistor (TST) 306 at a drain terminal thereof. The bottom select transistor 307 and the top select transistor 306 may be configured to activate a selected memory cell string 304 during read and program operations. In some implementations, sources of the memory cell strings 304 in the same memory block 303 may be coupled through a common source line (CSL) 310. In other words, all the memory cell strings 304 in the same memory block 303 have an array common source (ACS). According to some implementations, the top select transistor 306 of each memory cell string 304 is coupled to a corresponding bit line (BL) 311, and data may be read or written from the bit line 311 via an output bus (not shown). In some implementations, each memory cell string 304 is configured to be selected or unselected by applying a select voltage (e.g., a voltage above a threshold voltage of the top select transistor 306) or an unselect voltage (e.g., 0 V) to the corresponding top select transistor 306 via one or more top select lines (TSLs) 308 and/or by applying a select voltage (e.g., a voltage above a threshold voltage of the bottom select transistor 307) or an unselect voltage (e.g., 0 V) to the corresponding bottom select transistor 307 via one or more bottom select lines (BSLs) 309.

As shown in FIG. 4, the memory cell string 304 may be organized into a plurality of memory blocks 303, and each of the plurality of memory blocks 303 may have a common source line 310. In some implementations, each memory block 303 is a basic data unit for an erase operation, i.e., all the memory cells 305 on the same memory block 303 are erased at the same time. In order to erase the memory cells 305 in the selected memory block, the common source line 310 coupled to the selected memory block as well as unselected memory blocks that are in the same plane as the selected memory block may be biased with an erase voltage. It is to be understood that in some examples, the erase operation may be performed at a half memory block level, a quarter memory block level, or a level having any suitable number of memory blocks or any suitable fraction of a memory block. The memory cells 305 of adjacent ones of the memory cell strings 304 may be coupled through a word line 312, and the word line 312 selects which row of memory cells 305 is affected by the read or program operation.

Figure 5:
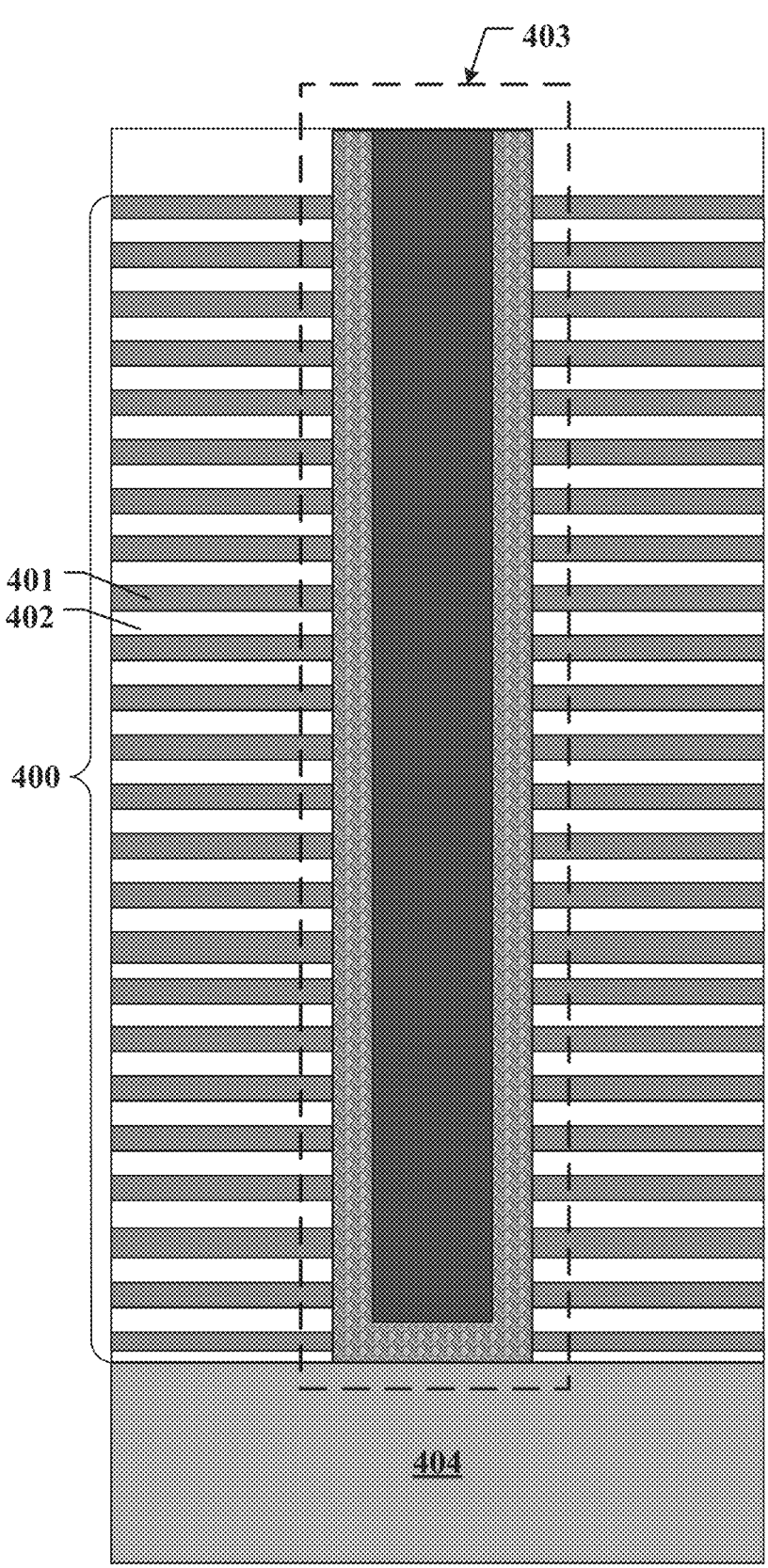
FIG. 5 is a schematic cross-sectional view of a memory array comprising a memory cell string provided by examples of the present disclosure.

FIG. 5 is a schematic cross-sectional view of a memory array comprising a memory cell string provided by examples of the present disclosure. As shown in FIG. 5, the memory array may comprise a stack structure 400. The stack structure 400 comprises a plurality of gate layers 401 and a plurality of insulation layers 402 that are alternately stacked in sequence, and a channel structure 403 vertically penetrating through the gate layers 401 and the insulation layers 402. The gate layers 401 and the insulation layers 402 may be alternately stacked, and two adjacent ones of the gate layers 401 are spaced apart by one insulation layer 402. The number of the memory cells included in the memory array is mainly related to the number of pairs of the gate layers 401 and the insulation layers 402 in the stack structure 400.

A composition material of the gate layer 401 may include a conductive material. The conductive material includes, but is not limited to, tungsten (W), cobalt (Co), copper (Cu), aluminum (Al), polysilicon, doped silicon, silicides, or any combination thereof. In some implementations, each gate layer 401 comprises a metal layer, e.g., a tungsten layer. In some implementations, each gate layer 401 comprises a doped polysilicon layer. The plurality of gate layers 401 surround one channel structure 403 to constitute one memory cell string. The gate layer 401 at top of the stack structure 400 may extend laterally as a top select gate line; the gate layer 401 at bottom of the stack structure 400 may extend laterally as a bottom select gate line; and the gate layers 401 that extend laterally between the top select gate line and the bottom select gate line may act as word line layers.

In some examples, the stack structure 400 may be disposed on a substrate 404. The substrate 404 may comprise silicon (e.g., single crystalline silicon), silicon germanium (SiGe), gallium arsenide (GaAs), germanium (Ge), silicon on insulator (SOI), germanium on insulator (GOI), or any other suitable materials.

It is to be noted that in some other examples, the memory array may only comprise the stack structure 400 and not comprise the substrate. Whether the memory array comprises the substrate is not limited by the present disclosure.

In some implementations, the channel structure 403 comprises a functional layer, a channel layer, and an insulation filling layer. In some implementations, the channel layer comprises silicon, e.g., polysilicon. In some implementations, the functional layer is a composite dielectric layer comprising a tunneling layer, a storage layer (also known as a "charge trapping/storage layer"), and a blocking layer. The channel structure 403 may have a cylinder shape (e.g., a pillar shape). According to some implementations, the channel layer, the tunneling layer, the storage layer, and the blocking layer are arranged radially from a center toward an outer surface of a pillar in this order. The tunneling layer may comprise silicon oxide, silicon oxynitride, or any combination thereof. The storage layer may comprise silicon nitride, silicon oxynitride, or any combination thereof. The blocking layer may comprise silicon oxide, silicon oxynitride, a high dielectric constant (high-k) dielectric, or any combination thereof. In one example, the functional layer may comprise a composite layer of silicon oxide/silicon oxynitride/silicon oxide (ONO).

Figure 6:
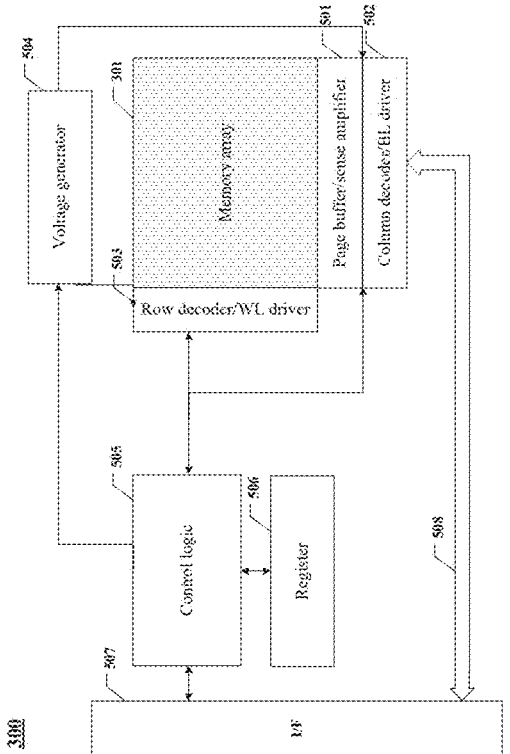
FIG. 6 is a schematic diagram of an example memory device comprising a memory array and a peripheral circuit provided by examples of the present disclosure.

Referring back to FIG. 4, the peripheral circuit 302 may be coupled to the memory array 301 through the bit lines 311, the word lines 312, the common source lines 310, the bottom select lines 309, and the top select lines 308. The peripheral circuit 302 may comprise any suitable analog, digital, and hybrid signal circuits for implementing the operations of the memory array 301 by applying and sensing voltage signals and/or current signals to and from each target memory cell 305 via the bit lines 311, the word lines 312, the common source lines 310, the bottom select lines 309, and the top select lines 308. The peripheral circuit 302 may include various types of peripheral circuits formed using a metal-oxide-semiconductor technology. For example, FIG. 6 shows some example peripheral circuits. The peripheral circuit 302 comprises a page buffer/sense amplifier 501, a column decoder/bit line driver 502, a row decoder/word line driver 503, a voltage generator 504, a control logic 505, a register 506, a flash memory interface 507, and a data bus 508. It is to be understood that in some examples, additional peripheral circuits not shown in FIG. 6 may be included as well.

The page buffer/sense amplifier 501 may be configured to read and program (write) data from and to the memory array 301 according to control signals from the control logic 505. In one example, the page buffer/sense amplifier 501 may store one page of program data (write data) to be programmed into the memory array 301. In another example, the page buffer/sense amplifier 501 may perform a program verify operation to ensure that the data has been properly programmed into the memory cell coupled to a selected word line. In yet another example, the page buffer/sense amplifier 501 may also sense a low power signal from the bit line that represents a data bit stored in the memory cell, and amplifies a small voltage swing to a recognizable logic level in the read operation. The column decoder/bit line driver 502 may be configured to be controlled by the control logic 505, and select one or more memory cell strings by applying a bit line voltage generated from the voltage generator 504.

The row decoder/word line driver 503 may be configured to be controlled by the control logic 505, select/unselect the memory block of the memory array 301, and select/unselect the word line of the memory block. The row decoder/word line driver 503 may be further configured to drive the word line using a word line voltage generated from the voltage generator 504. In some implementations, the row decoder/word line driver 503 may also select/unselect and drive the bottom select line and the top select line. As described below in detail, the row decoder/word line driver 503 is configured to perform the program operation on the memory cells that are coupled to (one or more) selected word lines. The voltage generator 504 may be configured to be controlled by the control logic 505 and generate a word line voltage (such as a read voltage, a program voltage, a pre-charge voltage, a pass voltage, a local voltage, a verify voltage, etc.), a bit line voltage and a source line voltage to be supplied to the memory array 301.

The control logic 505 may be coupled to each peripheral circuit described above and configured to control the operations of each peripheral circuit. The register 506 may be coupled to the control logic 505 and comprise a state register, a command register, and an address register, so as to store state information, a command operation code (OP code), and a command address for controlling the operations of each peripheral circuit. The flash memory interface 507 may be coupled to the control logic 505, and act as a control buffer to buffer and relay a control command received from a host (not shown) to the control logic 505, and buffer and relay the state information received from the control logic 505 to the memory controller. The flash memory interface 507 may be also coupled to the column decoder/bit line driver 502 via the data bus 508 and act as a data I/O interface and a data buffer to buffer and relay the data to and from the memory array 301.

The operations (such as a data write operation, a data read operation, and a data erase operation, etc.) of the memory system may be implemented by running a firmware stored in the memory system.

Abnormality may inevitably occur during operation of the firmware. In some examples, a corresponding command may be sent by a host to the memory system through a PCI Express (Peripheral Component Interconnect Express, PCIE) interface to trigger an assert dump mode, thereby terminating the running of the program and saving abnormal site information. If the PCIE interface has a firmware/software/hardware/communication fault, the host will be unable to send the corresponding command to the memory system to trigger the assert dump mode, such that the corresponding abnormal site information cannot be obtained, and it is difficult to identify the problem rapidly and effectively, which may affect efficiency of support and satisfaction of customers, and result in difficulties in debugging at a debug stage and hence a long period to solve the problem.

Figure 7:
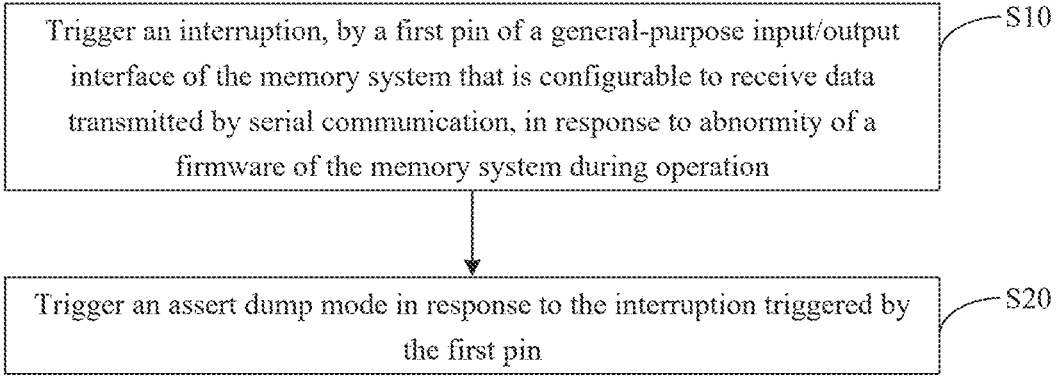
FIG. 7 is a flow diagram I of an operation method of a memory system provided by examples of the present disclosure.

The present disclose provides an operation method of a memory system. FIG. 7 is a flow diagram of an operation method provided by examples of the present disclosure. As shown in FIG. 7, the operation method of the memory system comprises the following operations.

Operation S10: an interruption is triggered by a first pin of a general-purpose input/output interface of the memory system that is configurable to receive data transmitted by serial communication, in response to abnormality of a firmware of the memory system during operation.

Operation S20: an assert dump mode is triggered in response to the interruption triggered by the first pin.

Here, the firmware is a program written into an erasable programmable read-only memory or an electrically erasable programmable read-only memory, and it refers to a device "driver" stored inside the memory system. Only through the firmware, an operating system can implement specific operation actions according to the standard device driver. The firmware is a software that serves the basic and the level work of a system.

In some examples, the firmware is stored in a read-only memory in a memory controller of the memory system or in a memory device.

Abnormality may inevitably occur during operation of the firmware. After the abnormality occurs during operation of the firmware, the assert dump mode needs to be triggered to save the abnormal site information. The abnormal site information may include core dump information such as a PC pointer, stack use information, and a register, etc. By saving the abnormal site information, the fault site is saved, thus providing data support for subsequent system recovery.

Here, the general-purpose input/output (GPIO) interface comprises the first pin that is configurable to receive data transmitted by serial communication, also known as Universal Asynchronous Receiver/Transmitter (UART) data or serial port data. Here, the first pin may be a UART GPIO pin.

UART is an important means for SSD development and debugging. UART data transmission is implemented by the GPIO pin on an SSD. From security reasons, the firmware may disable the UART function in the customer use version.

In the examples of the present disclosure, the first pin of the general-purpose input/output interface of the memory system is reused, and the interruption is triggered by the first pin, which in turn triggers the assert dump mode. In the examples of the present disclosure, in an aspect, a new method of triggering the assert dump mode is provided, such that the abnormal site information can be saved timely even if the PCI Express interface has a fault, thereby avoiding loss of the key abnormal site information and improving the problem solving efficiency. In another aspect, in the case where abnormality occurs during operation of the firmware, the first pin is in an idle state, and reusing the existing first pin has no impact on the performance of the memory system in the examples of the present disclosure. In still another aspect, since the existing first pin is reused in the present disclosure, lower cost is achieved.

In some examples, as shown in FIG. 10, the operation method further comprises: operation S1001: configuring the first pin into a first mode before triggering an interruption by a first pin of a general-purpose input/output interface of the memory system that is configurable to receive data transmitted by serial communication, wherein in the first mode the first pin is configurable to receive a level signal; and triggering the interruption by the first pin of the general-purpose input/output interface of the memory system that is configurable to receive the data transmitted by serial communication in operation S10 comprises: operation S1002: triggering the interruption when the level signal received by the first pin is in a first state in response to that the first pin is in the first mode.

In some examples, the general-purpose input/output interface is configurable to receive the data transmitted by serial communication or to receive the level signal. A corresponding mode may be set in the register, such that the first pin has the desired function. When the first pin is configured into the first mode, the first pin may be used to receive the level signal. When the first pin is configured into a second mode, the first pin may be used to receive the data transmitted by serial communication. In the case where the first pin is configured into the first mode, when the level signal received by the first pin is in a specific state, an interruption of a corresponding type may be triggered.

In some examples, the first state comprises a rising edge state or a falling edge state or a high level state or a low level state.

It will be appreciated that the first state may be any one of the rising edge state, the falling edge state, the high level state, and the low level state. The first pin may trigger the interruption in the first state through a corresponding configuration.

Here, the interruption may be interpreted as an interruption generated by a GPIO module, an edge triggered interruption, or a level triggered interruption, wherein the edge triggered interruption includes a rising edge triggered interruption and a falling edge triggered interruption. The level triggered interruption includes a high level triggered interruption and a low level triggered interruption.

The GPIO module can detect whether a value of an initial level on the first pin is 0 or 1 and can also change the level from 0 to 1 or from 1 to 0 by external extension. A central processing unit (CPU) receives an interruption request and performs processing. When the GPIO module detects a change in the level of the pin and an interruption triggering condition is met, the interruption will be triggered, and the CPU will jump to an interruption processing address for interruption processing. In order to avoid damaging main task data, the CPU will process and save a current relevant register and enter an interruption service function. After the execution of the interruption service function is completed, the CPU will recover the relevant register and return to the main task to continue executing the program.

The following is an example illustration that takes the first pin configured for a GPIO falling edge triggered interruption (i.e., the first state is the rising edge state) as an example.

Figure 11:
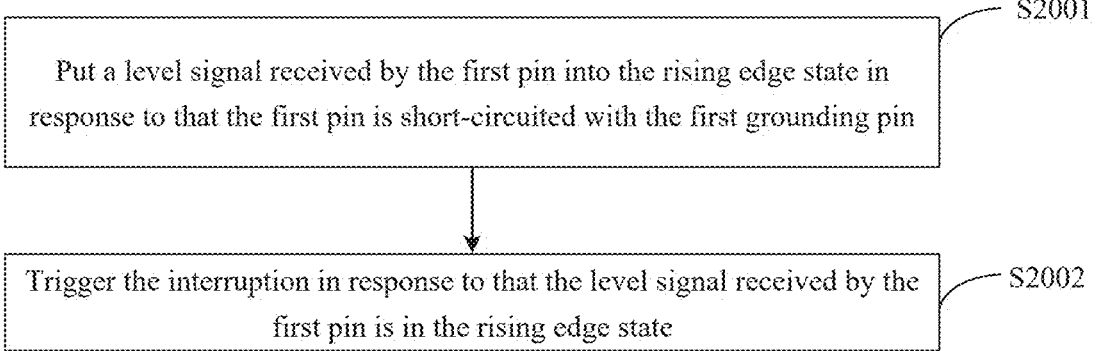
FIG. 11 is a flow diagram III of an operation method of a memory system provided by examples of the present disclosure.

In some examples, the memory system further comprises a first grounding pin. As shown in FIG. 11, triggering the interruption when the level signal received by the first pin is in the first state in response to that the first pin is in the first mode in operation S1002 comprises: operation S2001: putting the level signal received by the first pin into the rising edge state in response to that the first pin is short-circuited with the first grounding pin; and operation S2002: triggering the interruption in response to that the level signal received by the first pin is in the rising edge state.

In some examples, a pad corresponding to the first pin may be physically short-circuited with a pad corresponding to the first grounding pin, such that the first pin is short-circuited with the first grounding pin.

Here, an initial level of the first pin may be first set to a high level. After the pad corresponding to the first pin is short-circuited with the pad corresponding to the first grounding pin, the level signal of the first pin is pulled down, such that the level signal of the first pin is in the rising edge state.

Figure 8:
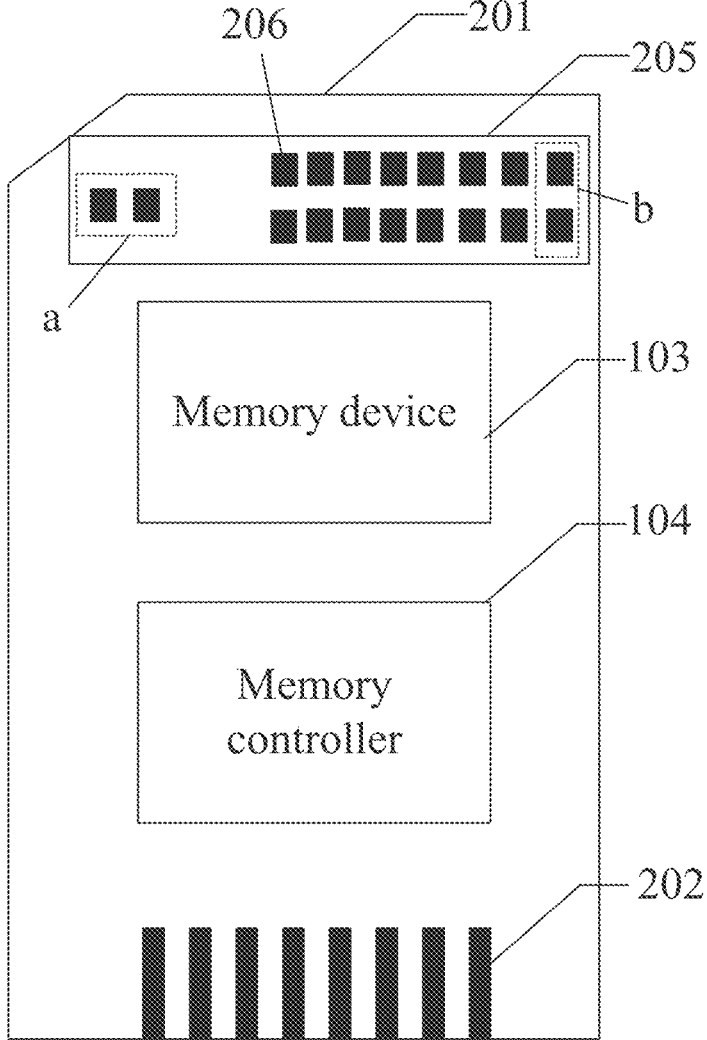
FIG. 8 is a schematic structural diagram I of a memory system provided by examples of the present disclosure.

As shown in FIGS. 2 and 8, the memory system comprises a memory card connector 202. The memory card connector 202 is configured to connect a host with the memory system, and comprises a PCI Express interface by which the memory system may communicate with the host to receive data and commands and return states and data to the host. The memory system further comprises a general-purpose input/ output interface 205 which may be connected with an external device (e.g., the host). The memory system needs to be debugged during research and development process. The general-purpose input/output interface comprises a plurality of pins 206, one of which is correspondingly connected with one pad. FIG. 8 illustrates some of the pins of the general-purpose input/output interface by examples. Different pins of the general-purpose input/output interface have different functions. For example, the first pin may be used to receive the data transmitted by serial communication for system debugging. Two pins in group b may be the first pin and the first grounding pin respectively. It is to be noted that the shape of the pin of the general-purpose input/output interface shown in FIG. 8 is merely an example and not intended to define the shape of the pin of the general-purpose input/ output interface. In some examples, the pin of the general-purpose input/output interface may also be in other shapes, such as a circle, a square, a rectangle, an irregular shape, etc.

Figure 9:
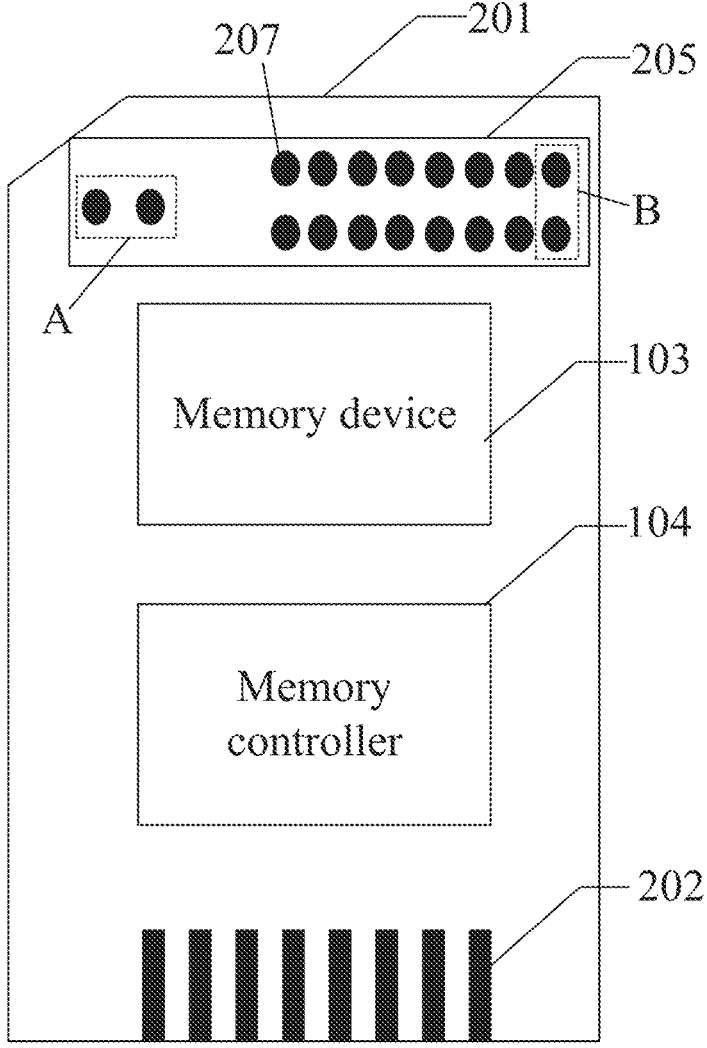
FIG. 9 is a schematic structural diagram II of a memory system provided by examples of the present disclosure.

In some examples, as shown in FIG. 9, the general-purpose input/output interface of the memory system such as an SSD may comprise a plurality of pads 207, wherein B is a group of pads in the SSD. One of two pads in the group B is a grounding pad that is correspondingly connected with the first grounding pin, and the other pad in the group B is correspondingly connected with the first pin. The two pads in the group B may be short-circuited by metal tweezers, such that the level signal of the first pin is in the rising edge state.

Figure 12:
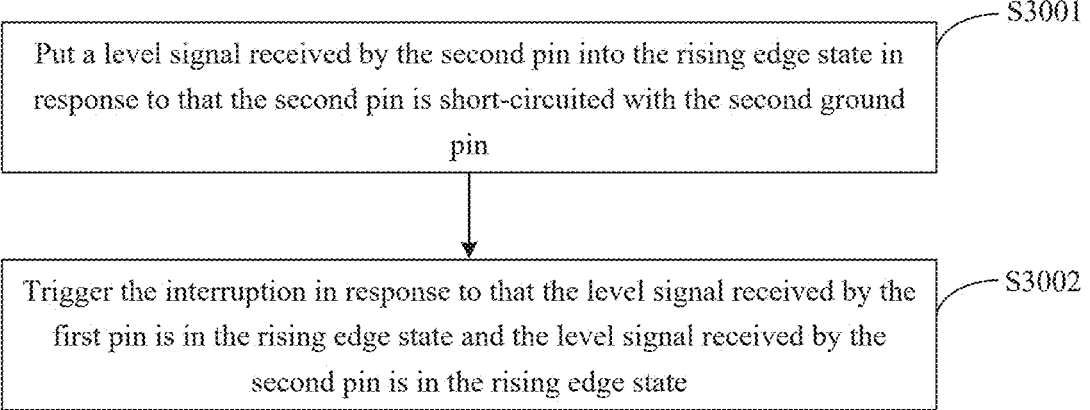
FIG. 12 is a flow diagram IV of an operation method of a memory system provided by examples of the present disclosure.

In some examples, the memory system further comprises a second pin and a second grounding pin. The second pin is configured to select a program start-up method when the memory system is powered on. As shown in FIG. 12, triggering the interruption when the level signal received by the first pin is in the first state in response to that the first pin is in the first mode in operation S1002 further comprises: operation S3001: putting a level signal received by the second pin into the rising edge state in response to that the second pin is short-circuited with the second grounding pin; and operation S3002: triggering the interruption in response to that the level signal received by the first pin is in the rising edge state and the level signal received by the second pin is in the rising edge state.

In some examples, the initial level of the first pin may be set to a high level. After the pad corresponding to the first pin is short-circuited with the pad corresponding to the first grounding pin, the level signal of the first pin is pulled down, such that the level signal of the first pin is in the rising edge state. Moreover, an initial level of the second pin may be set to a high level, such that when the second pin is short-circuited with the second grounding pin, the level signal of the second pin is pulled down, such that the level signal of the second pin is in the rising edge state.

It may be understood that, in the above examples, the interruption is triggered only when both of the level signals received by the first pin and the second pin are in the rising edge state, which may prevent false triggering and improve the accuracy of interruption triggering.

As shown in FIG. 8, two pins in group a may be the second pin and the second grounding pin respectively. As shown in FIGS. 9, A and B are two groups of pads on the SSD. One of two pads in the group A is a grounding pad that is correspondingly connected with the second grounding pin, and the other pad in the group A is correspondingly connected with the second pin. One of two pads in the group B is a grounding pad that is correspondingly connected with the first grounding pin, and the other pad in the group B is correspondingly connected with the first pin. The two groups of pads A and B may be two groups of pads with a certain distance, such that false triggering can be further prevented. First, the two pads in the group A may be short-circuited by metal tweezers, such that the level signal of the second pin is in the rising edge state; and then the two pads in the group B may be short-circuited by metal tweezers, such that the level signal of the first pin is in the rising edge state.

In some other examples, triggering the interruption when the level signal received by the first pin is in the first state in response to that the first pin is in the first mode further comprises: putting a level signal received by the second pin into the rising edge state in response to that the second pin is short-circuited with the first grounding pin; and triggering the interruption in response to that the level signal received by the first pin is in the rising edge state and the level signal received by the second pin is in the rising edge state.

In some examples, first, the pad correspondingly connected with the second pin in the group A as shown in FIG. 9 may be short-circuited with the grounding pad of the two pads in the group B by metal tweezers, such that the level signal of the second pin is in the rising edge state; and then the two pads in the group B may be short-circuited by metal tweezers, such that the level signal of the first pin is in the rising edge state.

In some examples, configuring the first pin into a first mode comprises: configuring the first pin into the first mode at a user usage stage.

It may be understood that at the user usage stage, the first pin does not need to receive the data transmitted by serial communication. Therefore, the first pin may be directly configured into the first mode at the user usage stage.

In some examples, the memory system further comprises a PCI Express interface, and configuring the first pin into the first mode comprises: at a debug stage of the memory system, configuring the first pin into the first mode in response to abnormality of the PCI Express interface and the abnormality of the firmware of the memory system during operation.

Here, the PCI Express interface is configured to connect the host with the memory system.

It may be understood that, at the debug stage of the memory system, the first pin needs to receive the data transmitted by serial communication. However, in the case where abnormality of the firmware of the memory system occurs during operation, debugging will be stopped, and the first pin temporarily does not need to receive the data transmitted by serial communication. In the case where the abnormality of the PCI Express interface occurs, the first pin may be configured into the first mode, such that the interruption can be triggered by the first pin, thereby triggering the assert dump mode.

The solution of triggering the interruption by the first pin to trigger the assert dump mode provided by the examples of the present disclosure may be also applied when no abnormality of the PCI Express interface occurs. In other words, when the assert dump mode needs to be triggered, in the case where no abnormality of the PCI Express interface occurs, the corresponding command may be sent by the PCI Express interface to trigger the assert dump mode, or the interruption may be triggered by the first pin to trigger the assert dump mode, which means multiple choices are provided.

In some examples, the operation method further comprises: performing assert dump processing in response to triggering the assert dump mode, wherein the assert dump processing comprises saving abnormal site information into the memory device.

In some examples, the abnormal site information may be first saved into a buffer of the memory controller, and then the abnormal site information in the buffer may be dumped into the memory device.

In the examples of the present disclosure, the GPIO hardware module interruption is triggered by short-circuiting the first pin with the first grounding pin. The interruption is processed with an interruption function corresponding to CPU0, the assert dump mode is triggered and CPU1 is informed of performing the assert dump processing, and then the assert dump processing is performed by the CPU1.

In some examples, the operation method further comprises: at the debug stage of the memory system, disabling the interruption in response to completing the assert dump processing; and configuring the first pin into a second mode in response to that the interruption is disabled, wherein in the second mode, the first pin is configurable to receive data transmitted by serial communication.

It may be understood that, at the debug stage, after the completion of the assert dump processing, functions of the system are disabled. In order to support further debugging, the configuration of the first pin needs to be recovered, and the first pin is configured into the second mode, such that the first pin may be used to receive a serial port command, thus enabling the CPU to execute a corresponding UART command.

In some examples, the operation method further comprises: sending the abnormal site information by the PCI Express interface to a host coupled with the memory system after the memory system is repowered on, in response to that the interruption is disabled.

It may be understood that, when it has a fault, the PCI Express interface may be recovered after the memory system is repowered on, such that the abnormal site information saved in the memory device can be read by the host, and thus problem can be analyzed.

Based on the concept similar to the operation method of the memory system described above, the present disclosure further provides a memory system comprising a memory device and a memory controller coupled with the memory device. The memory system comprises a general-purpose input/output interface, wherein the general-purpose input/output interface comprises a first pin that is configurable to receive data transmitted by serial communication, and the memory controller is configured to: trigger an interruption by the first pin in response to abnormality of a firmware of the memory system during operation; and trigger an assert dump mode in response to the interruption triggered by the first pin.

In some examples, the memory controller is further configured to: configure the first pin into a first mode before triggering the interruption by the first pin, wherein in the first mode the first pin is configurable to receive a level signal; and trigger the interruption when the level signal received by the first pin is in a first state in response to that the first pin is in the first mode.

In some examples, the first state comprises a rising edge state or a falling edge state or a high level state or a low level state.

In some examples, the memory system further comprises a first grounding pin, and the memory controller is configured to: put the level signal received by the first pin into the rising edge state in response to that the first pin is short-circuited with the first grounding pin; and trigger the interruption in response to that the level signal received by the first pin is in the rising edge state.

In some examples, the memory system further comprises a second pin and a second grounding pin, wherein the second pin is configured to select a program start-up method when the memory system is powered on, and the memory controller is further configured to: put a level signal received by the second pin into the rising edge state in response to that the second pin is short-circuited with the second grounding pin; and trigger the interruption in response to that the level signal received by the first pin is in the rising edge state and the level signal received by the second pin is in the rising edge state.

In some examples, the memory controller is configured to: configure the first pin into the first mode at a user usage stage.

In some examples, the memory system further comprises a PCI Express interface, and the memory controller is configured to: at a debug stage of the memory system, configure the first pin into the first mode in response to abnormality of the PCI Express interface and the abnormality of the firmware of the memory system during operation.

In some examples, the memory controller is further configured to: perform assert dump processing in response to triggering the assert dump mode, wherein the assert dump processing comprises saving abnormal site information into the memory device.

In some examples, the memory controller is further configured to: at the debug stage of the memory system, disable the interruption in response to completing the assert dump processing; and configure the first pin into a second mode in response to that the interruption is disabled, wherein in the second mode, the first pin is configurable to receive data transmitted by serial communication.

In some examples, the memory controller is further configured to: send, by the PCI Express interface, the abnormal site information to a host coupled with the memory system after the memory system is repowered on, in response to that the interruption is disabled.

In some examples, the memory system comprises a memory card or a solid state drive or a universal flash memory.

The present disclosure further provides a computer-readable storage medium storing a computer program which, when being executed, may implement the operation method as described in any of the above implementations.

Here, in order to implement all or part of processes in the operation method of the above examples, it may be accomplished by instructing the relevant hardware through the computer program. The computer program may be stored in a computer-readable storage medium. The execution of the computer program may include the processes of the operation method in any of the above examples. The computer-readable storage medium may be a magnetic disk, an optical disk, a Read-Only Memory (ROM), a Random Access Memory (RAM), a Flash Memory, a Hard Disk Drive (HDD), a solid state drive, or the like. The computer-readable storage medium may further comprise a combination of multiple storage media described above.

The features disclosed in several device examples provided by the present disclosure may be combined arbitrarily to obtain a new device example without conflicts.

The methods disclosed in several method examples provided by the present disclosure may be combined arbitrarily to obtain a new method example without conflicts.

In view of this, examples of the present disclosure provide a memory system, an operation method thereof, and a computer-readable storage medium in order to solve at least one of the problems present in the existing technology.

In a first aspect, examples of the present disclosure provide a memory system, comprising a memory device and a memory controller coupled with the memory device, and further comprising a general-purpose input/output interface, wherein the general-purpose input/output interface comprises a first pin that is configurable to receive data transmitted by serial communication, and the memory controller is configured to: trigger an interruption by the first pin in response to abnormality of a firmware of the memory system during operation; and trigger an assert dump mode in response to the interruption triggered by the first pin.

In an implementation, the memory controller is further configured to: configure the first pin into a first mode before triggering the interruption by the first pin, wherein in the first mode the first pin is configurable to receive a level signal; and trigger the interruption when the level signal received by the first pin is in a first state in response to that the first pin is in the first mode.

In an implementation, the first state comprises a rising edge state or a falling edge state or a high level state or a low level state.

In an implementation, the memory system further comprises a first grounding pin, and the memory controller is configured to: put the level signal received by the first pin into the rising edge state in response to that the first pin is short-circuited with the first grounding pin; and trigger the interruption in response to that the level signal received by the first pin is in the rising edge state.

In an implementation, the memory system further comprises a second pin and a second grounding pin, wherein the second pin is configured to select a program start-up method when the memory system is powered on, and the memory controller is further configured to: put a level signal received by the second pin into the rising edge state in response to that the second pin is short-circuited with the second grounding pin; and trigger the interruption in response to that the level signal received by the first pin is in the rising edge state and the level signal received by the second pin is in the rising edge state.

In an implementation, the memory controller is configured to: configure the first pin into the first mode at a user usage stage.

In an implementation, the memory system further comprises a PCI Express interface, and the memory controller is configured to: at a debug stage of the memory system, configure the first pin into the first mode in response to abnormality of the PCI Express interface and the abnormality of the firmware of the memory system during operation.

In an implementation, the memory controller is further configured to: perform assert dump processing in response to triggering the assert dump mode, wherein the assert dump processing comprises saving abnormal site information into the memory device.

In an implementation, the memory controller is further configured to: at the debug stage of the memory system, disable the interruption in response to completing the assert dump processing; and configure the first pin into a second mode in response to that the interruption is disabled, wherein in the second mode, the first pin is configurable to receive data transmitted by serial communication.

In an implementation, the memory controller is further configured to: send, by the PCI Express interface, the abnormal site information to a host coupled with the memory system after the memory system is repowered on, in response to that the interruption is disabled.

In an implementation, the memory system comprises a memory card or a solid state drive or a universal flash memory.

In a second aspect, examples of the present disclosure provide an operation method of a memory system, comprising: triggering an interruption by a first pin of a general-purpose input/output interface of the memory system that is configurable to receive data transmitted by serial communication, in response to abnormality of a firmware of the memory system during operation; and triggering an assert dump mode in response to the interruption triggered by the first pin.

In an implementation, the operation method further comprises: configuring the first pin into a first mode before triggering the interruption by the first pin of the general-purpose input/output interface of the memory system that is configurable to receive data transmitted by serial communication, wherein in the first mode the first pin is configurable to receive a level signal; and triggering the interruption by the first pin of the general-purpose input/output interface of the memory system that is configurable to receive data transmitted by serial communication comprises: triggering the interruption when the level signal received by the first pin is in a first state in response to that the first pin is in the first mode.

In an implementation, the first state comprises a rising edge state or a falling edge state or a high level state or a low level state.

In an implementation, the memory system further comprises a first grounding pin, and triggering the interruption when the level signal received by the first pin is in the first state in response to that the first pin is in the first mode comprises: putting the level signal received by the first pin into the rising edge state in response to that the first pin is short-circuited with the first grounding pin; and triggering the interruption in response to that the level signal received by the first pin is in the rising edge state.

In an implementation, the memory system further comprises a second pin and a second grounding pin, wherein the second pin is configured to select a program start-up method when the memory system is powered on, and triggering the interruption when the level signal received by the first pin is in the first state in response to that the first pin is in the first mode further comprises: putting a level signal received by the second pin into the rising edge state in response to that the second pin is short-circuited with the second grounding pin; and triggering the interruption in response to that the level signal received by the first pin is in the rising edge state and the level signal received by the second pin is in the rising edge state.

In an implementation, configuring the first pin into the first mode comprises: configuring the first pin into the first mode at a user usage stage.

In an implementation, the memory system further comprises a PCI Express interface, and configuring the first pin into the first mode comprises: at a debug stage of the memory system, configuring the first pin into the first mode in response to abnormality of the PCI Express interface and the abnormality of the firmware of the memory system during operation.

In an implementation, the operation method further comprises: performing assert dump processing in response to triggering the assert dump mode, wherein the assert dump processing comprises saving abnormal site information into the memory device.

In an implementation, the operation method further comprises: at the debug stage of the memory system, disabling the interruption in response to completing the assert dump processing; and configuring the first pin into a second mode in response to that the interruption is disabled, wherein in the second mode, the first pin is configurable to receive data transmitted by serial communication.

In an implementation, the operation method further comprises: sending the abnormal site information by the PCI Express interface to a host coupled with the memory system after the memory system is repowered on, in response to that the interruption is disabled.

In a third aspect, examples of the present disclosure provide a computer-readable storage medium having a computer program stored therein, which, when being executed, may implement the operation method of any one of the above implementations.

In the technical solutions provided by the examples of the present disclosure, the first pin of the general-purpose input/output interface of the memory system is reused, and the interruption is triggered by the first pin, which in turn triggers the assert dump mode. In the examples of the present disclosure, in an aspect, a new method of triggering the assert dump mode is provided, such that the abnormal site information can be saved timely even if the PCI Express interface has a fault, thereby avoiding loss of the key abnormal site information and improving the problem solving efficiency. In another aspect, in the case where abnormality occurs during operation of the firmware, the first pin is in an idle state, and reusing the existing first pin has no impact on the performance of the memory system in the examples of the present disclosure. In still another aspect, since the existing first pin is reused in the present disclosure, lower cost is achieved.

The above descriptions are merely specific implementations of the present disclosure, and the protection scope of the present disclosure is not limited to those. Any variation or replacement that may be readily figured out by those skilled in the art within the technical scope disclosed by the present disclosure shall fall within the protection scope of the present disclosure. Therefore, the protection scope of the present disclosure shall be defined by the protection scope of the claims.

What is claimed is:

1. A memory system, comprising a memory device and a memory controller coupled with the memory device, and the memory system further including a general-purpose input/output interface, wherein the general-purpose input/output interface includes a first pin that is configurable to receive data transmitted by serial communication, and the memory controller is configured to:

detect a change in a signal level of the first pin, wherein to detect the change in the signal level the first pin is configured to a first mode:

trigger an interruption by the first pin in response to an abnormality of a firmware of the memory system during operation, wherein the interruption is triggered in response to the signal level of the first pin satisfying a threshold and causing the first pin to switch from the first mode to trigger the interruption; and trigger an assert dump mode in response to the interruption triggered by the first pin, wherein, after triggering the assert dump mode, the first pin is configured to a second mode to receive the data transmitted by serial communication.

2. The memory system of claim 1, wherein the memory controller is further configured to:

configure the first pin into the first mode before triggering the interruption by the first pin, wherein, in the first mode, the first pin is configurable to receive the signal level; and trigger the interruption when the signal level received by the first pin is in a first state in response to the first pin being in the first mode.

3. The memory system of claim 2, wherein the first state includes a rising edge state, a falling edge state, a high level state, or a low level state.

4. The memory system of claim 3, further including a first grounding pin, wherein the memory controller is configured to:

put the signal level received by the first pin into the rising edge state in response to the first pin being short-circuited with the first grounding pin; and trigger the interruption in response to the signal level received by the first pin being in the rising edge state.

5. The memory system of claim 4, further including a second pin and a second grounding pin, wherein the second pin is configured to select a program start-up method when the memory system is powered on, and the memory controller is further configured to:

put the signal level received by the second pin into the rising edge state in response to the second pin being short-circuited with the second grounding pin; and trigger the interruption in response to the signal level received by the first pin being in the rising edge state and the signal level received by the second pin being in the rising edge state.

6. The memory system of claim 2, wherein the memory controller is configured to configure the first pin into the first mode at a user usage stage.

7. The memory system of claim 2, further including a PCI Express interface, wherein the memory controller is configured to, at a debug stage of the memory system, configure the first pin into the first mode in response to an abnormality of the PCI Express interface and the abnormality of the firmware of the memory system during operation.

8. The memory system of claim 7, wherein the memory controller is further configured to perform assert dump processing in response to triggering the assert dump mode, wherein the assert dump processing includes saving abnormal state information into the memory device.

9. The memory system of claim 8, wherein the memory controller is further configured to:

at the debug stage of the memory system, disable the interruption in response to completing the assert dump processing; and configure the first pin into the second mode in response to that the interruption is disabled.

10. The memory system of claim 9, wherein the memory controller is further configured to send, by the PCI Express interface, the abnormal state information to a host coupled with the memory system after the memory system is repowered on, in response to the interruption being disabled.

11. The memory system of claim 1, including a memory card, a solid state drive, or a universal flash memory.

12. An operation method of a memory system, comprising:

detecting a change in a signal level of a first pin of a general-purpose input/output interface of the memory system that is configurable to receive data transmitted by serial communication, wherein to detect the change in the signal level the first pin is configured to a first mode;

triggering an interruption by the first pin in response to an abnormality of a firmware of the memory system during operation, wherein the interruption is triggered in response to the signal level of the first pin satisfying a threshold and causing the first pin to switch from the first mode to trigger the interruption; and triggering an assert dump mode in response to the interruption triggered by the first pin, wherein, after triggering the assert dump mode, the first pin is configured to a second mode to receive the data transmitted by serial communication.

13. The operation method of claim 12, further including:

configuring the first pin into the first mode before triggering the interruption by the first pin, wherein, in the first mode, the first pin is configurable to receive the signal level; and triggering the interruption by the first pin when the signal level received by the first pin is in a first state in response to the first pin being in the first mode.

14. The operation method of claim 13, wherein the first state includes a rising edge state, a falling edge state, a high level state, or a low level state.

15. The operation method of claim 14, wherein the memory system further includes a first grounding pin, and triggering the interruption when the signal level received by the first pin is in the first state in response to the first pin being in the first mode includes:

putting the signal level received by the first pin into the rising edge state in response to the first pin being short-circuited with the first grounding pin; and triggering the interruption in response to the signal level received by the first pin being in the rising edge state.

16. The operation method of claim 15, wherein the memory system further includes a second pin and a second grounding pin, wherein the second pin is configured to select a program start-up method when the memory system is powered on, and triggering the interruption when the signal level received by the first pin is in the first state in response to the first pin being in the first mode further includes:

putting the signal level received by the second pin into the rising edge state in response to the second pin being short-circuited with the second grounding pin; and triggering the interruption in response to the signal level received by the first pin being in the rising edge state and the signal level received by the second pin being in the rising edge state.

17. The operation method of claim 13, wherein configuring the first pin into the first mode includes configuring the first pin into the first mode at a user usage stage.

18. The operation method of claim 13, wherein the memory system further includes a PCI Express interface, and configuring the first pin into the first mode includes, at a debug stage of the memory system, configuring the first pin into the first mode in response to an abnormality of the PCI Express interface and the abnormality of the firmware of the memory system during operation.

19. The operation method of claim 18, further including performing assert dump processing in response to triggering the assert dump mode, wherein the assert dump processing includes saving abnormal state information into a memory device.

20. The operation method of claim 19, further including:

at the debug stage of the memory system, disabling the interruption in response to completing the assert dump processing; and configuring the first pin into the second mode in response to the interruption being disabled.

* * * * *